May 26, 1959   E. A. GILBERT   2,888,661
ADAPTER FOR MAGNET CHARGER
Filed Dec. 13, 1956
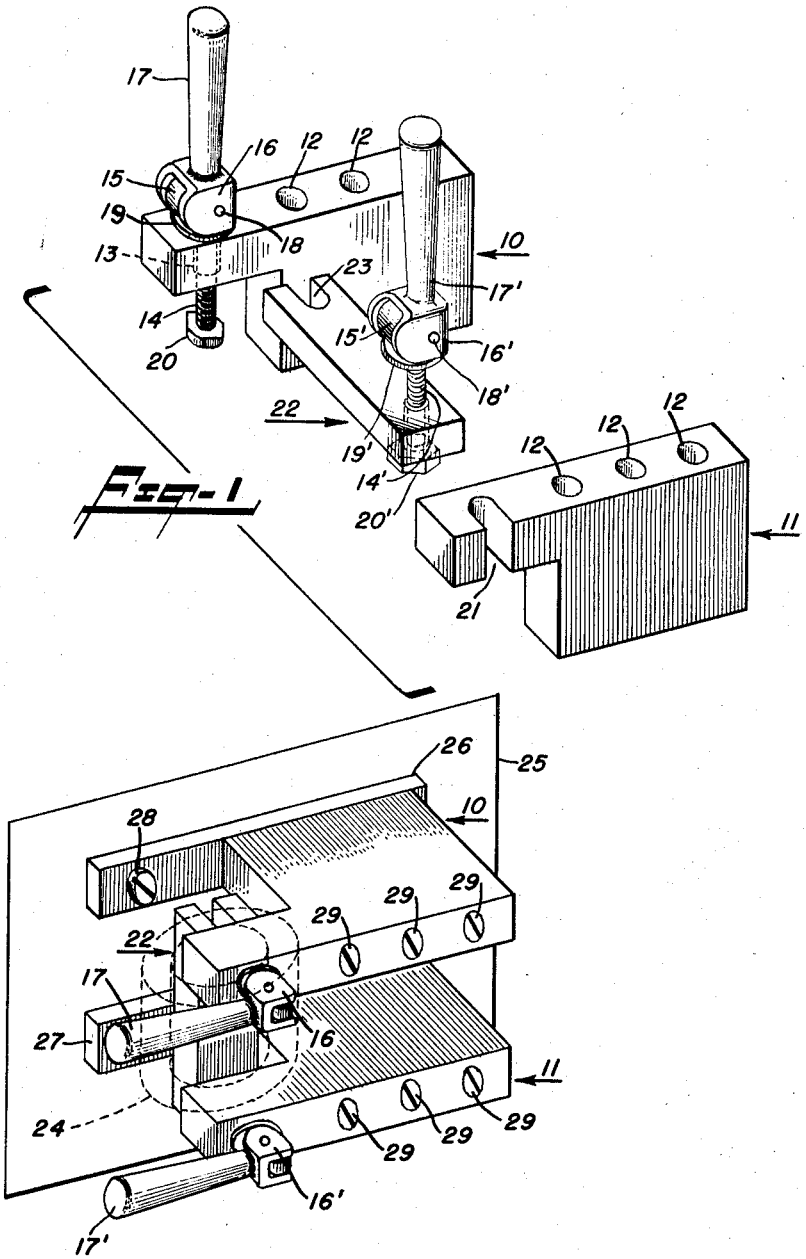
EVERETT A. GILBERT
INVENTOR.
BY
ATTORNEY United States Patent Office 2,888,661
Patented May 26, 1959

2,888,661
ADAPTER FOR MAGNET CHARGER

Everett A. Gilbert, Denville, N.J., assignor to Radio Frequency Laboratories, Boonton, N.J., a corporation of New Jersey Application December 13, 1956, Serial No. 628,016

3 Claims. (Cl. 339—147)

This invention relates to magnetizing apparatus and more particularly to a charging adapter arranged for removable connection to permanent contact bars of a magnet charger.

In magnet charging apparatus, of the type to which this invention is directed, a direct current pulse of high magnitude is passed through a copper conductor. The resulting high-intensity magnetic field which surrounds the conductor, is utilized to charge the magnet, the latter being disposed in the magnetic field and oriented to provide desired magnetic poles. In the case of certain magnet shapes as, for example, ring magnets and C-shaped magnets having narrowly-spaced ends, it is necessary to break the copper current-conducting circuit and insert a current conductor through the central opening of the magnet. In such cases, it is desirable to provide a mechanical arrangement which will require a minimum time for disconnecting and connecting the current-conducting circuit. At the same time the current-conducting circuit must be such that the mechanical joints offer no appreciable resistance to the flow of the charging current. Also, and, importantly, the cooperating parts of the circuit must be such as to withstand the very high mechanical forces occurring during the flow of the charging current.

An object of this invention is the provision of an adapter for a magnet charger, which adapter is of rugged construction, and which affords a maximum of convenience for use with magnets having such shapes as to require a physical separation of the charging current path in order to properly position the magnet for charging purposes.

An object of this invention is the provision of an adapter for a magnet charger, said adapter including a removable member forming part of the charging current conducting path, and means whereby such member may readily be connected to complete the current conducting path in such manner that electro-mechanical stresses arising during the charging operation tend to maintain the current conducting path at a low resistance level.

An object of this invention is the provision of an adapter for a magnet charger including a pair of fixed bars forming part of the charging current path, a removable bar adapted electrically to join the two fixed bars, and cam action means to retain a good mechanical and electrical joint between the removable bar and the fixed bars.

These and other objects and advantages will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

Figure 1 is an exploded, perspective view showing the component parts of an adapter made in accordance with this invention; and Figure 2 shows the adapter in assembled form on the mounting plate of a magnet charger.

Referring now to Figure 1, the adapter comprises a pair of copper blocks 10 and 11 each provided with three holes 12 extending transversely through the widest portion of the block. The left-hand portion of the block 10 is of reduced width and includes a hole 13 having a diameter of sufficient size to clear the bolt 14 passing therethrough. The bolt 14 is a threaded eye bolt having a ring head 15 disposed within a slotted, or bifurcated, head 16 of a handle member 17. A rivet 18 passes through the head 16 and loosely through the ring head 15 of the bolt. The lower end surfaces of the bifurcated head are flat and rest upon a washer 19 when the handle member 17 is in a substantially vertical position as shown in the drawing. On the other hand, the arcuate side edges of the head 16 are off-centered with respect to the rotational axis of the head provided by the rivet 18. Specifically, when the handle member 17 is rotated 90 degrees in a counter-clockwise direction, to bring the arcuate edges of the head into surface contact with the washer 19, there is provided a cam action resulting in an upward withdrawal of the bolt 14 through the hole 13. A cap nut 20 is tightly threaded on the free end of the eye bolt. The block 11 is similar in construction to the block 10 except that it is provided with a slot 21 at the forward end, said slot corresponding to the hole 13 in the block 10.

The third member of the adapter comprises a flat copper bar 22 having a slot 23 at one end and a transverse hole at the other. A handle member 17' has its head 16' pivotally attached to the ring head 15' of the eye bolt 14' by a rivet 18'. Such bolt passes through the washer 19' and the clearance hole provided in the bar 22 and carries the cap nut 20'. The cam action of the head 16', upon a counter-clockwise rotation of the handle 17', is the same as that of the head 16, already described. As will be described in more detail hereinbelow, with reference to Figure 2, the blocks 10 and 11 are bolted to a magnet charger, and when so bolted, remain in fixed position. The bar 22, on the other hand, is designed for quick and positive attachment to the blocks. For this purpose, the length of the exposed, threaded portion of the eye bolt 14', that is, the bolt length between the cap nut 20' and the lower surface of the bar 22, is slightly larger than the thickness of the block 11 at the forward end which includes the slot 21. Similarly, the exposed length of the bolt 14 is slightly longer than the thickness of the bar 22. Consequently, the bar 22 can be bridged across the two blocks by simultaneously slipping the bolt 14' into the slot 21 formed in the block 11 and sliding the slotted end of the bar 22 over the exposed portion of the bolt 14 carried by the block 10. When the bar 22 is so positioned, rotation of first one, and then the other, of the handle members 17, 17' will firmly clamp the bar 22 against the underlying surfaces of the blocks.

Reference is now made to Figure 2, which shows the adapter secured in operative position for charging a ring magnet 24, shown in dotted lines. There is here shown a panel 25 made of a suitable insulating material and carried by a magnet charger. Extending through the panel are a pair of spaced, parallel contact portions or bars 26, 27, which bars are firmly secured to and form the ends of a single turn, heavy, secondary coil of the magnet charger transformer, not shown. Such bars are secured to the transformer coil by means of bolts, such as the bolt 28, visible in the drawing, to form a good physical and electrical contact therewith, said bolts having heads recessed within suitable bores so that the blocks 10 and 11 abut the surface of the underlying contact bars. The blocks, in turn, are secured to the cooperating contact bars by screws 29 which enter into threaded holes provided in the contact bars. The mating surfaces of the contact bars and the blocks are carefully milled, and preferably cleaned before assembly, all for the purpose of reducing to a minimum the electrical resistance of the joint so formed. Once mounted, as shown in Figure 2, the copper blocks 10 and 11 remained fixed.

In order to magnetize a magnet, such as the ring magnet 24, it is necessary to conduct the charging current through the hole formed in the magnet, and for this purpose, the bar 22 is detachable from the blocks. As shown in Figure 2, the handle members 17, 17' are shown in the locked position wherein the bar 22 is tightly pressed against the blocks 10 and 11. The firm clamping action of the cam-acting heads 16, 16' reduces to a minimum the electrical resistance of the joints between the blocks and the bar. Equally important is the fact that the detachable bar 22 is disposed behind the ends of the blocks so that the large mechanical forces, occurring when the high charging current flows through the adapter, are used to force the parts forming the joint even tighter together. To remove the magnet 24 from the adapter, it is merely necessary to rotate the handle members into line with the cooperating eye bolts whereupon the bar 22 drops downwardly.

Having now described the invention, those skilled in this art will find no difficulty in making changes and modifications to meet specific requirements. It is intended that such changes and modifications shall fall within the scope and spirit of the invention as recited in the following claims.

I claim:

1. An adapter for use on a magnet charger of the type including spaced current-conducting bars, said adapter comprising a first copper block having an integral extended portion with a hole formed therein; means securing the first block firmly to one of the said current-conducting bars with the extended portion spaced from the said bar; a second copper block having an integral extended portion with a slot formed therein, means securing the second block firmly to the other of the said current-conducting bars with the extended portion spaced from the said bar; a copper bar spanning the extended portions of said blocks and abutting the inner surfaces thereof; a slot in one end of said copper bar; cam-acting means carried by the extended portion of the said first block and including a rod portion extending through the slot in the said copper bar; and cam-acting means carried by the other end of said copper bar and including a rod portion extending through the slot in the said block; each of said cam-acting means being movable to one position firmly to attach the copper bar to the blocks and to another position to detach the copper bar from said blocks.

2. The invention as recited in claim 1, wherein each of the cam-acting means includes an eye bolt pivotally attached to a handle member and a nut threaded on an end of the eye bolt and abutting a surface of the said copper bar.

3. An adapter for a magnet charger of the type including a pair of spaced current-conducting bars, said adapter comprising a pair of copper blocks secured to the current-conducting bars, the said blocks having an extended end portion of reduced width, a copper bar removably attached across spaced ends of the said blocks in abutting relation against the inner surfaces of the blocks at the extended end portions thereof, a slot in the extended end portion of one of the said blocks extending to a surface thereof, one end of the said bar being provided with a slot extending to the end of the bar, and a pair of cam-acting means securing the ends of the bar firmly to each of the said blocks, one said cam-acting means passing through the slot in the block and the other cam-acting means passing through the slot in the bar.

References Cited in the file of this patent
UNITED STATES PATENTS

| | | |
|---|---|---|
| 760,737 | Harleman | May 24, 1904 |
| 1,046,465 | Hoyt | Dec. 10, 1912 |
| 2,665,415 | Kojis | Jan. 5, 1954 |